US012461494B2

(12) United States Patent
Nicolas et al.

(10) Patent No.: US 12,461,494 B2
(45) Date of Patent: Nov. 4, 2025

(54) MODULAR WATCH

(71) Applicant: The Swatch Group Research and Development Ltd, Marin (CH)

(72) Inventors: Cédric Nicolas, Neuchâtel (CH); Jean-Jacques Born, Morges (CH); Sophie Napoli, Neuchâtel (CH); Nicolas François, Neuchâtel (CH); Pablo Rodriguez, Marin-Epagnier (CH)

(73) Assignee: The Swatch Group Research and Development Ltd, Marin (CH)

( * ) Notice: Subject to any disclaimer, the term of this patent is extended or adjusted under 35 U.S.C. 154(b) by 342 days.

(21) Appl. No.: 18/184,074

(22) Filed: Mar. 15, 2023

(65) Prior Publication Data

US 2023/0418231 A1 Dec. 28, 2023

(30) Foreign Application Priority Data

Jun. 28, 2022 (EP) .................................... 22181550

(51) Int. Cl.
*G04B 37/00* (2006.01)
*G04B 13/00* (2006.01)

(52) U.S. Cl.
CPC ......... *G04B 37/0008* (2013.01); *G04B 13/00* (2013.01)

(58) Field of Classification Search
CPC .... G04B 37/0008; G04B 13/00; G04B 37/18; G04B 45/0092; G04B 19/02; G04B 39/00; G04B 19/06; G04B 27/00; G04B 37/11; G04B 39/02
See application file for complete search history.

(56) References Cited

U.S. PATENT DOCUMENTS

| | | | | |
|---|---|---|---|---|
| 3,487,629 A * | 1/1970 | Mochizuki | G04C 3/065 318/132 |
| 3,695,035 A * | 10/1972 | Cleusix | G04B 27/005 968/249 |
| 9,927,771 B2 * | 3/2018 | Marechal | G04B 37/12 |
| 2020/0319598 A1 * | 10/2020 | Born | G04C 11/084 |
| 2021/0191334 A1 * | 6/2021 | Surmely | G04B 27/007 |

FOREIGN PATENT DOCUMENTS

| | | |
|---|---|---|
| DE | 2 263 742 A1 | 7/1974 |
| DE | 25 47 657 A1 | 4/1977 |
| EP | 0 862 098 A2 | 9/1998 |

OTHER PUBLICATIONS

European Search Report for 22 18 1550, dated Nov. 23, 2022.

* cited by examiner

*Primary Examiner* — Edwin A. Leon
(74) *Attorney, Agent, or Firm* — Sughrue Mion, PLLC

(57) ABSTRACT

A modular watch (1) including at least a middle (10), a back (11), a display module (12) having a dial, time display, a crystal and a first magnetic gear, a horological module (13) including a horological movement with a second magnetic gear arranged to cooperate with the magnetic gear of the display module (12), and first and second bracelet strands integral with the middle (10) at a pair of horns (20, 30). The display module (12) and the horological module (13) are mounted one on top of the other, the display module (12) being mounted such that it is fixed against the middle (10), and the horological module (13) being mounted such that it can rotate between the back (11) and the display module (12) in order to set the time.

10 Claims, 2 Drawing Sheets

MODULAR WATCH

CROSS REFERENCE TO RELATED APPLICATIONS

This application claims priority to European Patent Application No. 22181550.9 filed Jun. 28, 2022, the entire contents of which are incorporated herein by reference.

TECHNICAL FIELD OF THE INVENTION

The invention relates to a modular mechanical part.

More specifically, the invention relates to a modular mechanical watch formed by a plurality of interchangeable modules.

TECHNOLOGICAL BACKGROUND

The appearance of a watch is generally determined by the shape and/or colour of the middle, the crown, and potentially by the glass, the dial and the hands. The bracelet can also contribute to the aesthetic appearance of the watch.

It is of particular interest to wearers today to be able to change the appearance of their watch to match their outfit for example, or to stand out from other watch models.

There is thus an interest in proposing a watch whose appearance can be easily modified and/or customised by the wearer to suit current fashion.

Similarly, the external parts are often subject to scratches or other wear when the watch is worn daily, whereas the movement remains in perfect condition. Thus, when the case is too damaged or worn, the wearer must go to a specialist shop to replace it.

A modular watch is known, for example, from the European patent document No. 0862 098, where the appearance of the watch can be changed with varying degrees of ease. Such a watch comprises a display module wherein the dial, the hands and a protective glass are mounted, and a horological module housing the movement, the two modules being designed to be removable from one another. Such a watch thus allows the appearance of the display module thereof to be changed, while preserving the horological module.

Although this solution is partially satisfactory, a problem arises as regards watertightness between the two modules. More specifically, the water resistance of such a watch is far from reliable due to the plurality of shafts extending outside the horological module. Similarly, such a solution poses a problem when the display case is replaced by another, as this implies disconnecting the display hands, which leads to a desynchronisation of the hands that becomes apparent when the horological module is reassembled.

SUMMARY OF THE INVENTION

The main purpose of the present invention is to provide a modular watch whose appearance is easily changed by the wearer, with reliable water resistance and which does not require the watch to be set after a module has been replaced.

To this end, the invention relates to a modular watch comprising at least:

- a middle;
- a back;
- a display module comprising a dial, time display means, a crystal and first magnetic gear means;
- a horological module comprising a horological movement with second magnetic gear means arranged to cooperate with the magnetic gear means of the display module;
- first and second bracelet strands integral with the middle at a pair of horns.

According to the invention, the display module and the horological module are mounted one on top of the other, said display module being mounted such that it is fixed against the middle, and the horological module being mounted such that it can rotate between the back and the display module in order to set the time.

According to other advantageous alternative embodiments of the invention:

- the magnetic gear means comprises a first minute wheel having at least one magnet, said first minute wheel being arranged to cooperate with a second minute wheel of the second magnetic gear means, said second minute wheel also having at least one magnet;
- the display and horological modules are both water-resistant;
- the horological module comprises an angular positioning toothing cooperating with resilient means integral with the display module or the middle to retain the horological module in a determined angular position;
- the time display means comprise an hour hand and a minute hand;
- the modular watch comprises means for locking the rotation of the horological module, said locking means being formed by a portion of the bracelet strands between each pair of horns of the middle cooperating with the horological module;
- the rotation locking means comprise a groove formed on the outer periphery of the horological module;
- the groove formed on the outer periphery of the horological module comprises N×60 notches, N being strictly greater than zero;
- the top face of the horological module which faces the display module is closed by a non-ferromagnetic plate;
- the horological module comprises a mechanical movement or a quartz movement;
- the centre of rotation of the horological module, the centre of rotation of the first minute wheel and the centre of rotation of the second minute wheel are coaxial.

BRIEF DESCRIPTION OF THE FIGURES

Other features and advantages of the invention will become apparent upon reading the following detailed description given by way of a non-limiting example, and with reference to the accompanying drawings, in which.

DETAILED DESCRIPTION OF THE INVENTION

Figure 1:
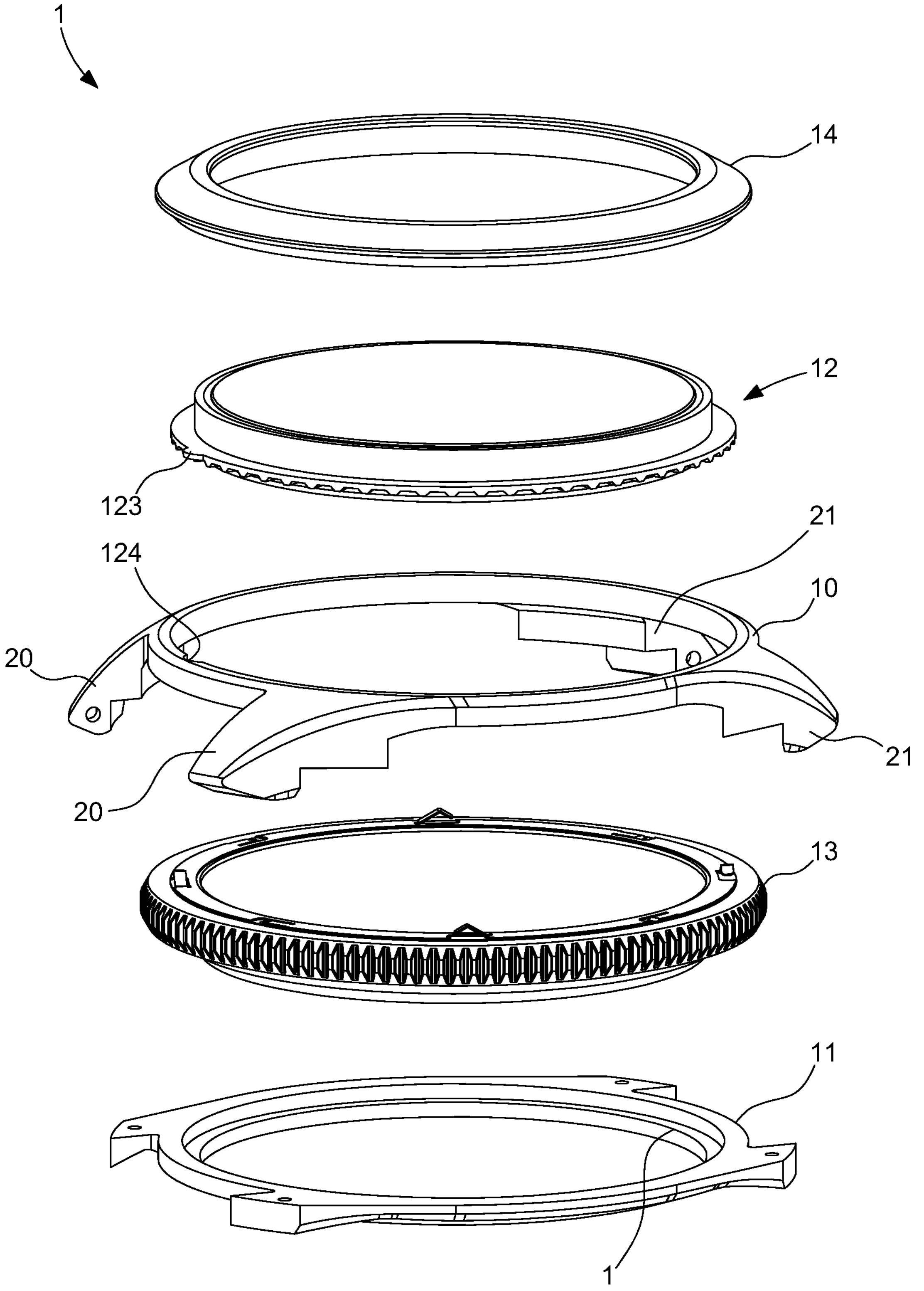
FIG. 1 shows an exploded, perspective view of a modular watch according to the invention.

FIG. 1 shows a modular watch 1 according to the invention. The watch comprises a middle 10, a back 11, a display module 12 comprising a dial 2, time display means, a crystal 5, and a horological module 13 comprising a horological movement. The watch 1 further comprises two bracelet strands fixed to the middle 10 at two pairs of horns 20, 21, the strands being fixed by means of a bar. The watch 1 can further comprise a rotating or non-rotating bezel 14.

The display means conventionally comprise an hour hand 3 and a minute hand 4. The display means can further comprise a second hand, however this makes setting the time less practical.

The horological module 13 is arranged to receive a mechanical movement or a quartz movement and comprises first gear means adapted to be able to ensure the rotation of the hour hand 3 and minute hand 4 of the display module 12 about a rotational axis A. The display module comprises the dial 2, the hands 3, 4, the crystal 5 and second gear means cooperating with the first gear means of the horological module 13.

The first and second gear means are in the form of magnetic wheels forming a magnetic transmission between the display module and the horological module.

These magnetic gear means are particularly well adapted to such a modular watch and allow for easy assembly or disassembly between the two modules 12, 13 without worrying about coupling any shafts in order to drive the hands, about hand desynchronisation, or about water resistance issues.

More specifically, the magnetic transmission enables the construction of the display module 12 and of the horological module 13 to be made water-resistant, as the latter do not require a transmission shaft (or a plurality of coaxial staffs) to be used therebetween in order to drive the display hands.

Conventionally, the hour and minute hands 3, 4 each comprise a plate 30, 40 extending parallel to the dial 2 and the end whereof is arranged to indicate the current hour and minutes on the dial. The hands 3, 4 further comprise a cylindrical part, referred to as a pipe 31, 41, with an axis of symmetry coinciding with the rotational axis A, each pipe being provided such that it is integral with an hour wheel 122 and minute wheel 120 respectively.

Conventionally, the pipe 41 of the minute hand extends in the same direction as the pipe 31 of the hour hand 3, the pipe 41 of the minute hand 4 fitting into the pipe 31 of the hour hand 3. In this way, each hand is adapted to be driven such that it rotates about the same rotational axis A.

According to the invention, the first and second gear means are in the form of magnetic wheels, each of the wheels receiving at least one magnet 121, 131 at the periphery thereof. Advantageously, the magnetic wheels comprise a first minute wheel 120 having at least one magnet 121, the first minute wheel 120 being arranged to cooperate with a second minute wheel 130 of the second magnetic gear means, the second minute wheel 130 also having at least one magnet 131.

The horological module is closed on the side facing the display module or the top face by a non-ferromagnetic plate such as a sapphire plate for example. The bottom face of the horological module can be closed by a conventional metal back, a sapphire crystal to see the calibre or can even be made in one piece with the module.

Figure 2:
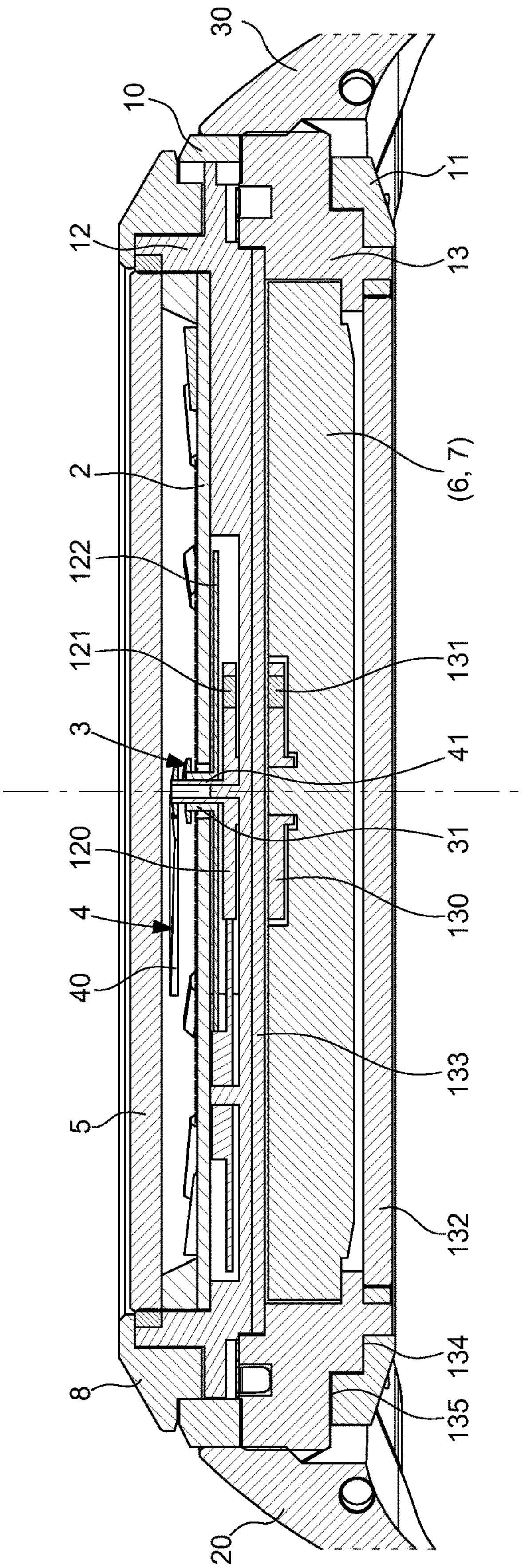
FIG. 2 shows a sectional view of a modular watch according to the invention.

As can be seen in FIGS. 1 and 2, the horological module 13 has, on the bottom face thereof, two successive shoulders 134, 135 arranged to cooperate with the back 11. Such an arrangement allows for simple and reliable assembly while allowing the horological module 13 to rotate relative to the back 11.

The display module 12 is placed over the horological module 13 and is mounted such that it is fixed against the middle 10. The display module 12 can be fixed to the middle 10 by placing it from below or above the middle 10 and can be held by a bezel 14 for example.

In the case where the display module 12 is placed from below the middle 10, the latter is indexed relative to the middle 10 via positioning means such as a protuberance 123 integral with the display module 12 and arranged to cooperate with a notch 124 formed in the middle 10. The display module 12 is thus held between the middle 10 and the horological module 13 once the back 11 has been fixed to the middle 10.

In the case where the display module 12 is placed from above the middle 10, the latter is also indexed relative to the middle 10 via positioning means such as a protuberance 123 integral with the module 12 and arranged to cooperate with a notch 124 formed in the middle 10. In order to hold the display module 12 in place on the middle 10, a bezel 14 is screwed onto the middle 10 over the display module 12, and the horological module 13 is held between the middle 10 and the back 11 once the latter has been fixed to the middle 10.

It goes without saying that other methods for mounting the display module can be used without requiring major modifications, for example a thread can be arranged on the inner wall of the middle 10 in order to screw the display module 12 therein.

A modular watch 1 according to the invention comprises means for locking the rotation of the horological module 13. Advantageously, the locking means are formed by a portion of the bracelet strands between each pair of horns 20, 30 of the middle. Each of the portions is arranged to cooperate with the horological module, the horological module 13 comprising a groove 40 formed on the outer periphery thereof and arranged to cooperate with the locking means.

Advantageously, the groove corresponds to a multiple of the minute-circle with N×60 notches so as to be able to position the minute hand precisely, N being strictly greater than zero.

Thus, in the rest state or in the locked position, the portions of the bracelet strands between each pair of horns 20, 30 rest against the outer periphery and prevent rotation thereof.

According to a first embodiment, the bracelet strands are made from an elastomer material in order to maximise frictional forces and provide reliable locking of the horological module.

According to a second embodiment, at least one bracelet strand comprises a rigid catch cooperating with the horological module, the catch being housed between a notch in two grooves and completely locking the horological module.

To allow the horological module 13 to rotate, and to move into a so-called freely rotatable position, simply pinch at least one bracelet strand in the vicinity of a pair of horns 20, 30 to make the strand pivot about the bar, attaching it to the middle or to make the strand pivot under the watch to release the catch from a notch and thus free the horological module such that it can rotate.

Such locking means are thus particularly well adapted for a modular watch and for preventing unintentional rotation of the horological module and causing the time to change.

According to another embodiment, the horological module comprises an annular angular positioning toothing (not shown in the figures), at the periphery of the top face thereof (i.e. the face in contact with the display module), the toothing cooperating with elastic means integral with the display module so as to retain the horological module in a determined angular position.

According to the invention, the horological module 13 is mounted such that it can rotate between the back and the display module 12 in order to set the time. To set the time, simply rotate the entire horological module.

As the centre of rotation of the horological module is the same as that of the first and of the second minute wheels carrying the magnets, a rotation of the module will result in a rotation of the minute hand of the display module. According to the invention, one complete revolution of the horological module is equivalent to one complete revolution of the minute hand. It goes without saying that a different gear ratio could be considered where necessary.

Such a construction has the advantage of simplifying the architecture of the horological movement, and of minimising the high-risk areas as regards water resistance. This is because such a watch does not have any crown or push-pieces with O-rings. Thus, only one joint remains, namely a crystal joint or back joint to close the horological module.

More specifically, all of the components usually used to set the time are no longer necessary, and only the minimum remains, namely the kinematic chain from the pipe to the escapement.

Thanks to these different aspects of the invention, the invention provides a modular watch that can be easily customised by the wearer without worrying about the transmission between the movement and the hands, or about any water resistance issues.

It goes without saying that the present invention is not limited to the example shown and that various alternatives and modifications that may be apparent to a person skilled in the art can be made thereto, while still remaining within the scope of the invention as defined by the claims.

The invention claimed is:

1. A modular watch comprising:

a middle;

a back;

a display module comprising a dial, time display means, a crystal and first magnetic gear means; and a horological module comprising a horological movement with second magnetic gear means arranged to cooperate with the magnetic gear means of the display module;

wherein the display module and the horological module are mounted one on top of the other, said display module being mounted such that it is fixed against the middle, and the horological module being mounted such that it can rotate between the back and the display module in order to set the time.

2. The modular watch according to claim 1, wherein the magnetic gear means comprises a first minute wheel having at least one magnet, said first minute wheel being arranged to cooperate with a second minute wheel of the second magnetic gear means, said second minute wheel also having at least one magnet.

3. The modular watch according to claim 1, wherein the display module and horological module are both water-resistant.

4. The modular watch according to claim 2, wherein the display module and horological module are both water-resistant.

5. The modular watch according to claim 1, wherein the time display means comprise an hour hand and a minute hand.

6. The modular watch according to claim 1, further comprising means for locking the rotation of the horological module.

7. The modular watch according to claim 6, wherein the rotation locking means comprise a groove formed on the outer periphery of the horological module.

8. The modular watch according to claim 7, wherein the groove formed on the outer periphery of the horological module comprises Nx60 notches, N being strictly greater than zero.

9. The modular watch according to claim 1, wherein the horological module comprises a mechanical movement or a quartz movement.

10. The modular watch according to claim 1, wherein the centre of rotation of the horological module, the centre of rotation of the first minute wheel and the centre of rotation of the second minute wheel are coaxial.

* * * * *